US006971071B1

(12) United States Patent
Impas et al.

(10) Patent No.: US 6,971,071 B1
(45) Date of Patent: Nov. 29, 2005

(54) SYSTEM AND METHOD FOR IMPLEMENTING AN IMAGE ANCILLARY TO A CURSOR

(75) Inventors: Romualdo T. Impas, Seattle, WA (US); Cecil J. Juanarena, Bellevue, WA (US); Gilman K. Wong, Redmond, WA (US); Joseph H. Matthews III, Woodinville, WA (US); J. Andrew Goossen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/520,389

(22) Filed: Mar. 8, 2000

Related U.S. Application Data

(60) Provisional application No. 60/138,433, filed on Jun. 10, 1999.

(51) Int. Cl.[7] .............................................. G06F 3/00
(52) U.S. Cl. ...................... 715/859; 715/754; 715/856; 715/858; 715/861
(58) Field of Search ................................ 345/754, 856, 345/858, 859, 861, 581, 426, 592, 619, 626, 345/597, 604, 837

(56) References Cited

U.S. PATENT DOCUMENTS

| | | | | |
|---|---|---|---|---|
| 5,270,688 A | * | 12/1993 | Dawson et al. ............. 345/150 |
| 5,655,066 A | * | 8/1997 | Martin et al. ............... 345/700 |
| 5,898,432 A | * | 4/1999 | Pinard ......................... 345/765 |
| 6,134,345 A | * | 10/2000 | Berman et al. ............. 382/162 |
| 6,225,979 B1 | * | 5/2001 | Taima et al. ................ 345/157 |
| 6,384,840 B1 | * | 5/2002 | Frank et al. ................ 345/634 |

* cited by examiner

*Primary Examiner*—Ba Huynh
*Assistant Examiner*—Mylinh Tran
(74) *Attorney, Agent, or Firm*—Westman, Champlin & Kelly, P.A.

(57) ABSTRACT

A system and method to display an ancillary image which is movable with a cursor image. A cursor image indication is obtained which is indicative of the cursor image. An ancillary image indication is generated based on the cursor image indication. The cursor image and the ancillary image are displayed based on the cursor image indication and the ancillary image indication.

39 Claims, 8 Drawing Sheets

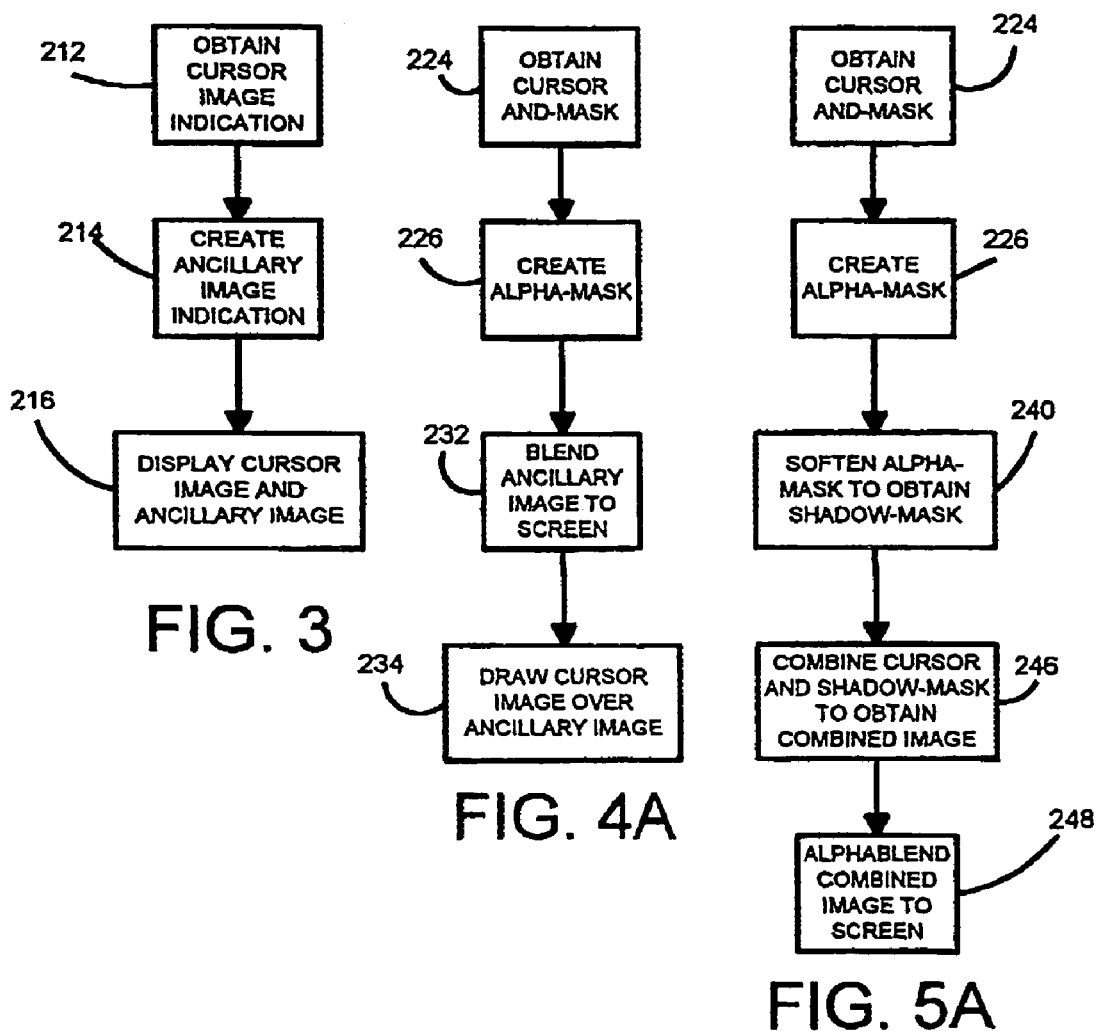

SYSTEM AND METHOD FOR IMPLEMENTING AN IMAGE ANCILLARY TO A CURSOR

REFERENCE TO RELATED APPLICATION

The present application claims priority from U.S. provisional application Ser. No. 60/138,433, filed on Jun. 10, 1999, entitled CURSOR SHADOWS.

BACKGROUND OF THE INVENTION

The present invention relates to a computer system. More specifically, the present invention relates to a system which provides an ancillary image, ancillary to the cursor image.

Conventional computers, such as desktop computers, typically include a visual display screen, such as a cathode ray tube(CRT). Conventional computers also typically include a user input pointing device, such as a mouse. The mouse typically includes a ball and position encoders. As the user moves the mouse over a work surface, the ball rotates and the position encoders provide position information to the computer. The position information is indicative of the movement of the mouse. Based on the position information, the computer system typically moves a mouse cursor about the visual display screen allowing the user to acquire targets on the visual display screen.

A conventional mouse also typically includes one or more actuator buttons. The actuator buttons are typically actuable by the operator by simply depressing the selected button. Actuation of the buttons can implement a number of different features. For example, where the user has acquired a target (e.g., an icon), by placing the mouse cursor over the icon on the visual display screen, the user may typically be able to select the feature or program represented by that icon by simply depressing one of the actuator buttons after the target has been acquired.

In one conventional system, the cursor is associated with an arrow, or other visible display element which moves about the screen. The cursor display element or display image is conventionally treated the same as any other object on the display screen, from a depth perception standpoint. Therefore, when the display screen is displaying a large number of icons, windows, or other display elements, the cursor can be difficult to locate and follow during operation.

SUMMARY OF THE INVENTION

A system and method display in ancillary image which is movable with a cursor image. A cursor image indication is obtained which is indicative of the cursor image. An ancillary image indication is generated based on the cursor image indication. The cursor image and the ancillary image are displayed based on the cursor image indication and the ancillary image indication.

In one illustrative embodiment, the ancillary image is a shadow cast by the cursor image. Therefore, while the cursor image is opaque, the ancillary image is translucent. Of course, the ancillary image can take any other of a wide variety of forms, some of which are discussed below. However, the ancillary image is movable along with the cursor during operation.

BRIEF DESCRIPTION OF THE DRAWINGS

FIG. 3 is a flow diagram illustrating creation and display of the ancillary image in accordance with one embodiment of the present invention.

FIG. 4A is a flow diagram illustrating creation of an ancillary image in greater detail in accordance with one embodiment of the present invention.

FIG. 5A is a flow diagram illustrating creation of an ancillary image in greater detail in accordance with one embodiment of the present invention.

DETAILED DESCRIPTION OF THE PREFERRED EMBODIMENTS

Overview

Figure 1:
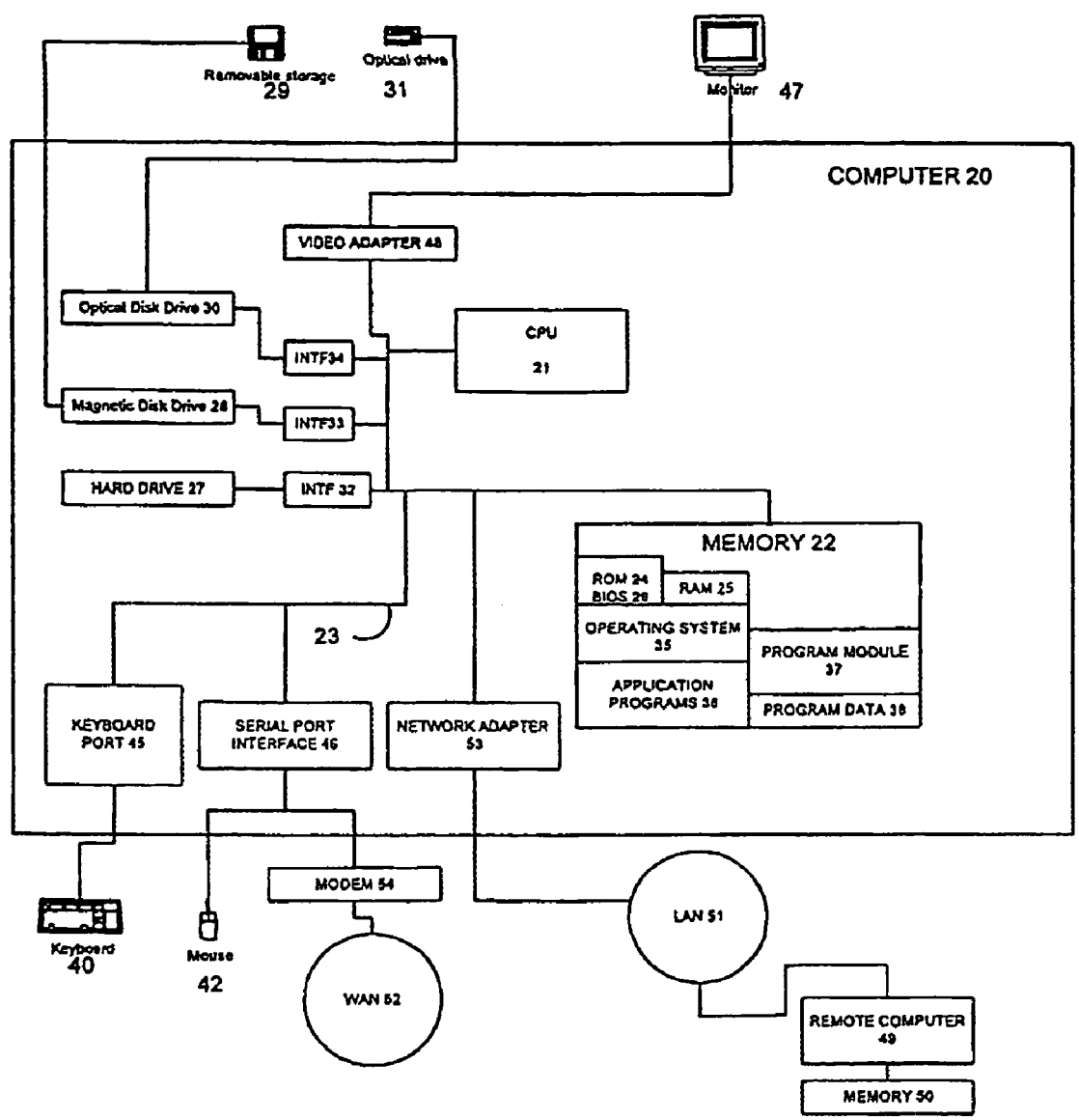
FIG. 1 is a block diagram of an exemplary environment for implementing the present invention.

In one embodiment, the present invention is a method, apparatus and display which enables cursor shapes or images to be displayed with shadows. In another embodiment, the present invention is a method, apparatus and display which enables cursor shapes or images to be specified or represented by an alpha, red, green, blue (ARGB) bitmap image. In one embodiment, the present invention provides an image ancillary to a cursor image. FIG. 1 and the related discussion are intended to provide a brief, general description of a suitable computing environment in which the invention may be implemented.

Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, palmtop computers and the like. The invention is also applicable in distributed computing environments where tasks are performed by remote processing devices that are linked through a communications network. In a distributed computing environment, program modules may be located in both local and remote memory storage devices.

With reference to FIG. 1, an exemplary environment for the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memory (RAM), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device (or mouse) 42. Other input devices (not shown) may include a touch pad, roller ball, microphone, joystick, game pad, satellite dish, scanner, or the like. These and other input devices are often connected to the processing unit 21 through one of a plurality of ports. For instance, keyboard 40 is connected through a keyboard port 45, and mouse 42 is connected through serial port interface 46 but could also be connected through a Mouse-Port or a PS/2 port.

In the illustrative embodiment, keyboard port 45 and serial port interface 46 are coupled to the system bus 23. User input devices may also be connected by other interfaces, such as a sound card, a parallel port, a game port or a universal serial bus (USB). A monitor 47 or other type of display device is also connected to the system bus 23 via an interface, such as a video adapter 48 controlled by a graphics engine either integrated with or located separately from operating system 35. Of course, the display can be provided on a CRT or any other type of display device, such as plasma display, an LED or LCD device, as examples. In addition to the monitor 47, personal computers may typically include other peripheral output devices such as a speaker and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Figure 2:
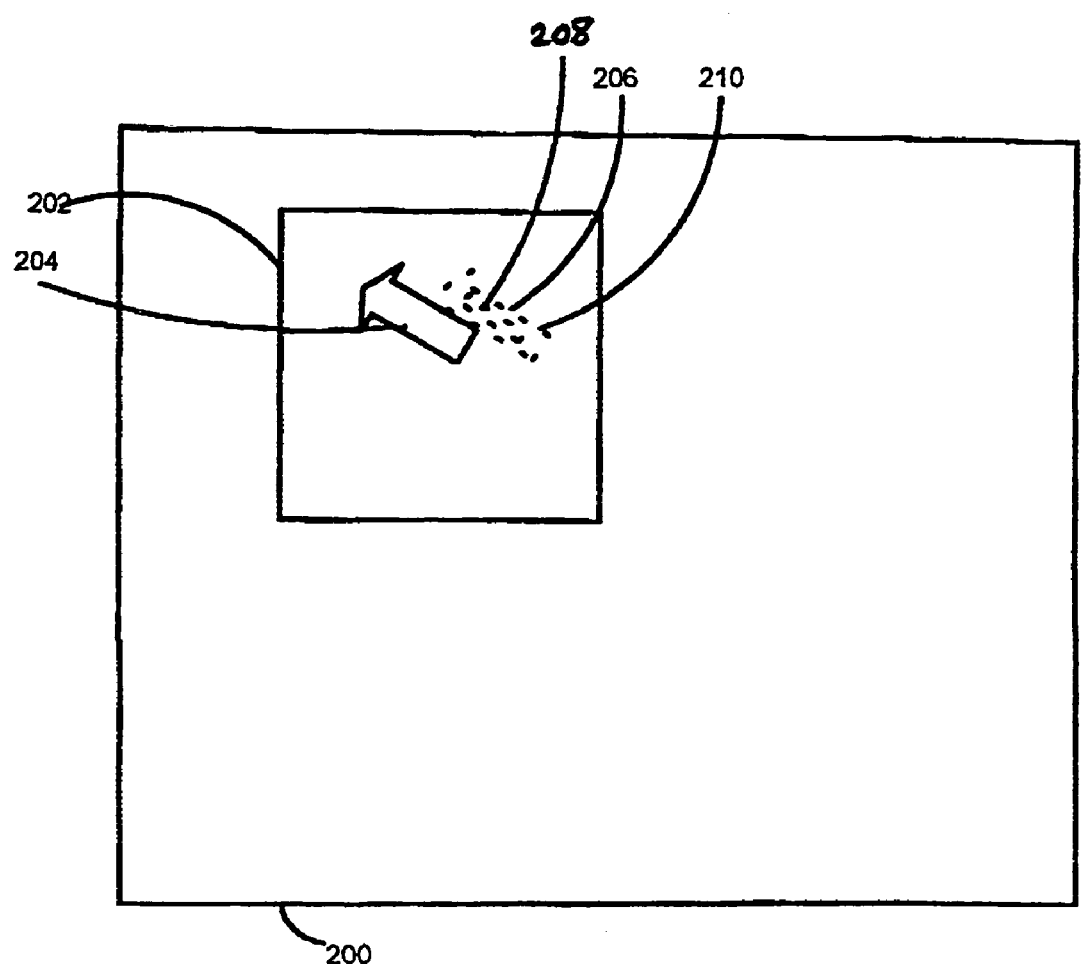
FIG. 2 illustrates a cursor image with an ancillary image in accordance with one embodiment of the present invention.

FIG. 2 illustrates a display screen 200 (such as that found on monitor or display device 47). Display screen 200 is illustrated with a cursor image 202 displayed thereon. Cursor image 202 includes an opaque portion 204 which is illustrated as an arrow-type pointer. However, it will be appreciated by those skilled in the art that the particular opaque portion 204 of cursor image 202 can take substantially any shape. In accordance with one embodiment of the present invention, cursor image 202 is represented by an alpha blended ARGB bitmap image. This can be accomplished in any number of ways. For example, many operating systems have built-in cursor image generation systems. One such system is described below by way of example only, and is used in generating a cursor image in accordance with one embodiment of the present invention. However, an alpha blended ARGB cursor image of the present invention can be generated in any other desired fashion, such as by being directly specified by an application, thus bypassing the operating system's built-in cursor image generation.

Cursor image 202 also illustrates an ancillary image 206. In the embodiment illustrated in FIG. 2, ancillary image 206 is a shadow which follows opaque portion 204 of cursor image 202 around the screen, as the cursor is moved. While the arrow 204 is opaque, ancillary image 206 is translucent such that the images displayed on screen 200 beneath ancillary image 206 are visible, but shaded. Also, in the embodiment illustrated in FIG. 2, ancillary image (or shadow image) 206 is provided with an umbra portion 208 and a penumbra portion 210. The umbra portion 208, being located generally centrally on ancillary image 206, is darker, while penumbra 210, being located toward the outer periphery of ancillary image 206, is more translucent. This gives the shadow a more realistic and "fuzzy" appearance, rather than a sharp appearance. Of course, ancillary image 206 can be implemented as simply a sharp image, as desired.

FIG. 3 is a flow diagram illustrating one embodiment of the formation and display of the ancillary image 206 along with opaque portion 204 of cursor image 202. It should again be noted that creation of an alpha blended ARGB bitmap cursor image can be directly specified by an application and need not have an ancillary image per se, but simply be a composite image incorporating per pixel alpha and color values. FIG. 3 describes but one embodiment of generation of an ARGB bitmap cursor image, and also includes an ancillary image which is based on the cursor image.

First, an indication of the cursor image is obtained. This is indicated by block 212 in FIG. 3. The image of the cursor can be a bitmap or other similar indication which illustrates cursor image 202. Next, based on the opaque portions of cursor image 202, the ancillary image 206 is created. This is indicated by block 214. In an embodiment in which ancillary image 206 is a shadow, the opaque portion 204 of cursor image 202 can simply be augmented with an offset and translucency value in order to obtain the ancillary image. This is described in greater detail below. Next, the opaque portion of the cursor and the ancillary image are both displayed on the display screen. This is indicated by block 216.

Figure 4B:
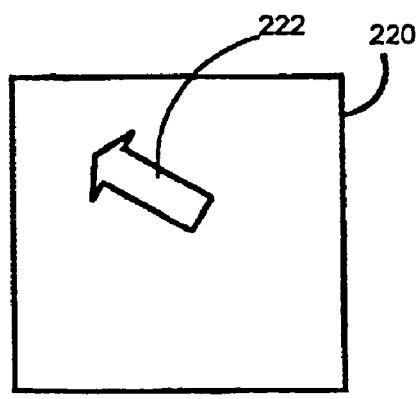
FIGS. 4B–4D illustrate the creation of an ancillary image as described with respect to FIG. 4A in accordance with one embodiment of the present invention.
Figure 4C:
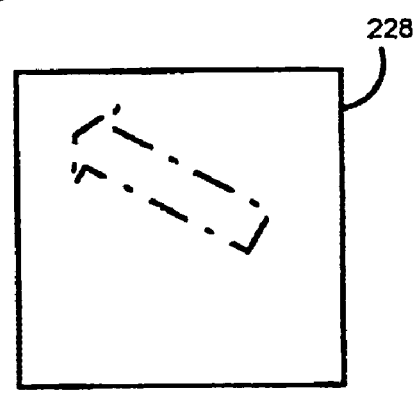
Figure 4D:
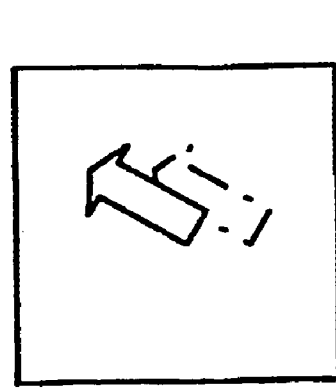

FIG. 4A illustrates the creation and display of an ancillary image in greater detail. FIGS. 4B–4D illustrate portions of cursor image 200 during the creation and display of the ancillary image 206 and opaque portion 204.

Most cursor images 202 have an associated AND-mask. The AND-mask is a monochrome bitmap of the same dimensions as the bitmap defining the cursor image. In the associated AND-mask, each bit defines whether the corresponding pixel in the cursor image is visible or non-visible. For example, FIG. 4B illustrates an AND-mask 220 for the cursor image 202 shown in FIG. 2. The bits within arrow 222 (which corresponds to the opaque portion 204 of cursor image 202) are given a value of zero, which means those pixels are visible. The bits residing within AND-mask 220, but outside of arrow 222 (i.e., which correspond to the invisible pixels of cursor image 202—ignoring the ancillary image 206 for now) are given a value of 1 which indicate that the corresponding pixels are invisible. In any case, the cursor AND-mask is first obtained. This is indicated by block 224 in FIG. 4A.

Next, in one illustrative embodiment, an ALPHA-mask (which illustratively includes both alpha and color channel information) is obtained. This is described in greater detail below. Briefly, however, the AND-mask 220 is expanded and each invisible bit (bit value 1 on the AND-mask) is mapped to a value of zero, while each visible bit (bit value zero on the AND-mask) is mapped to a non-zero value. Creating the ALPHA-mask is illustrated by block 226 in FIG. 4A. The ALPHA-mask is illustrated by FIG. 228 in FIG. 4C. ALPHA-mask 228 contains a silhouette of the cursor 222 shown in AND-mask 220 of FIG. 4B. Thus, in one embodiment, the ALPHA-mask is simply blended to the screen, and the cursor is drawn on top of the ALPHA-mask. This is shown by numeral 230 in FIG. 4D, and is illustrated by blocks 232 and 234 in FIG. 4A. Blending the images to the screen can also be combined into a single step, and is discussed in greater detail below.

While the ALPHA-mask can be used to generate the ancillary image (in this case a shadow), the ALPHA-mask has very sharply defined edges. This may not be the most aesthetically pleasing embodiment.

Figure 5B:
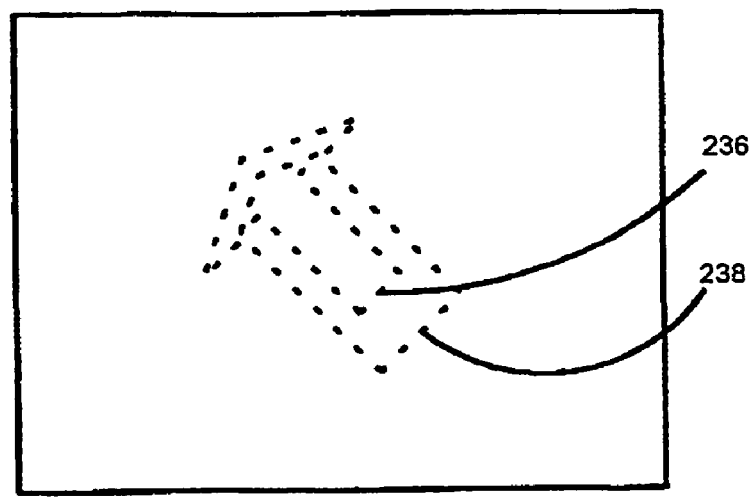
FIGS. 5B and 5C illustrate the creation of the ancillary image as described with respect to FIG. 5A.
Figure 5C:
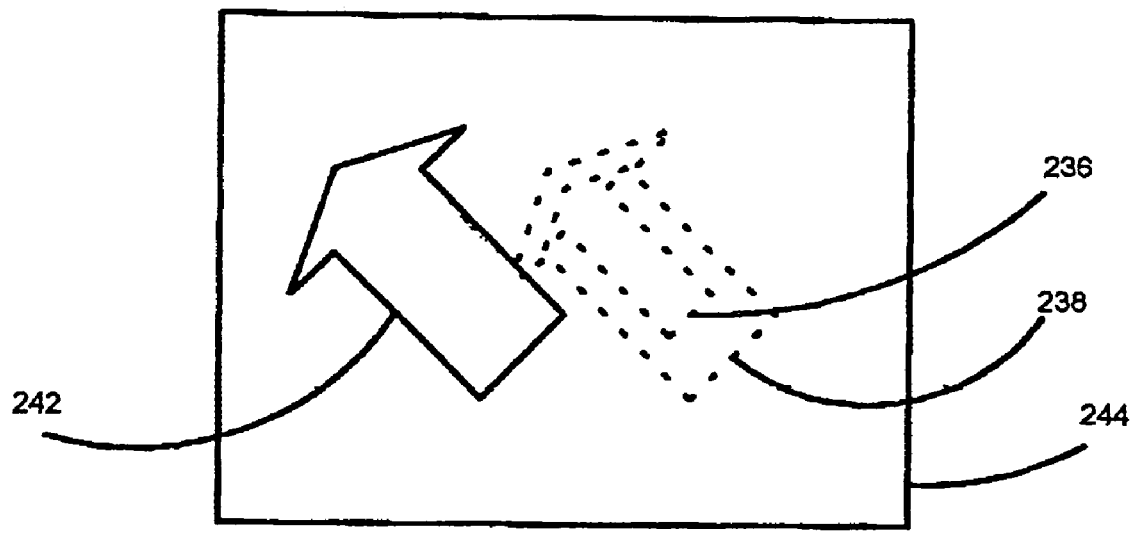

To create a more realistic looking ancillary image (e.g., a shadow), the edges of the ALPHA-mask can be softened. This is illustrated in greater detail in FIGS. 5A–5C. FIG. 5A is a flow diagram illustrating further steps which can be used to create a more aesthetically desirable ancillary image. FIGS. 5B and 5C illustrate such images.

The first portion of FIG. 5A is similar to that shown in FIG. 4A, and is similarly numbered. Therefore, the cursor AND-mask is first obtained as illustrated in block 224, and the ALPHA-mask is created as illustrated in block 226. As discussed above, the creation of the ALPHA-mask is discussed in greater detail below with respect to FIGS. 6A–6B.

However, in the embodiment illustrated in FIGS. 5A–5C, once the ALPHA-mask is obtained, it is softened to obtain a shadow mask. In one illustrative embodiment, the ALPHA-mask is filtered by a convolution filter, or another similar filter (such as an averaging filter) to soften its edges.

In one illustrative embodiment, the ALPHA-mask is filtered twice with a three by three (box car) convolution filter which is well known in the art. Briefly, each resulting pixel value is computed as the average of the corresponding source pixel and its eight closest neighboring pixels. The contributing pixels form a three by three array of pixels centered around the corresponding source pixel. This type of filter has a blurring effect. Because the ALPHA-mask is subjected to the filtering operation twice, the resultant shadow image now contains an interior portion (or umbra) 236 shown in FIG. 5B, and an exterior portion (or penumbra) 238. The interior portion 236 is darker while the exterior portion 238 is more translucent. Of course, at this point, the pixels outside of the shadow have an alpha value of zero and the soft edges have a value somewhere between zero and one. This will be referred to hereinafter as the SHADOW-mask. Softening the ALPHA-mask to obtain the SHADOW-mask is illustrated by block 240 in FIG. 5A.

In the embodiment illustrated in FIG. 5A, the cursor image (242 illustrated in FIG. 5C) and the shadow images 236 and 238 are combined to obtain a combined image 244. This is indicated by block 246 in FIG. 5A. The combined image 244 is ALPHA blended to the screen of monitor 47, as indicated by block 246. Combining the images is discussed in greater detail with respect to FIG. 7.

Figure 6B:
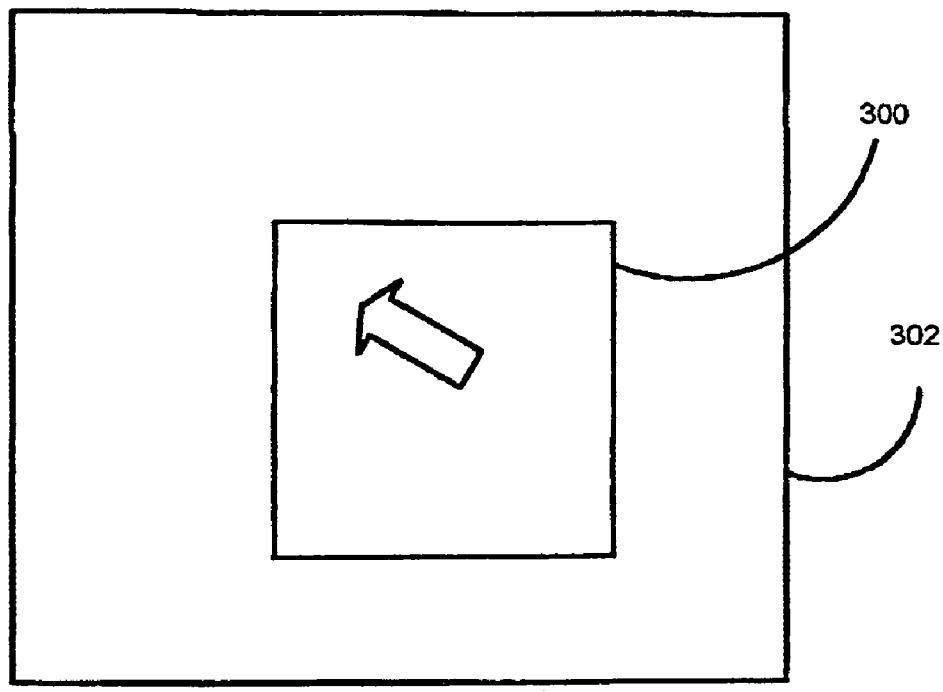
FIG. 6B illustrates the creation of the ALPHA and SHADOW-masks as described with respect to FIG. 6A.
Figure 6A:
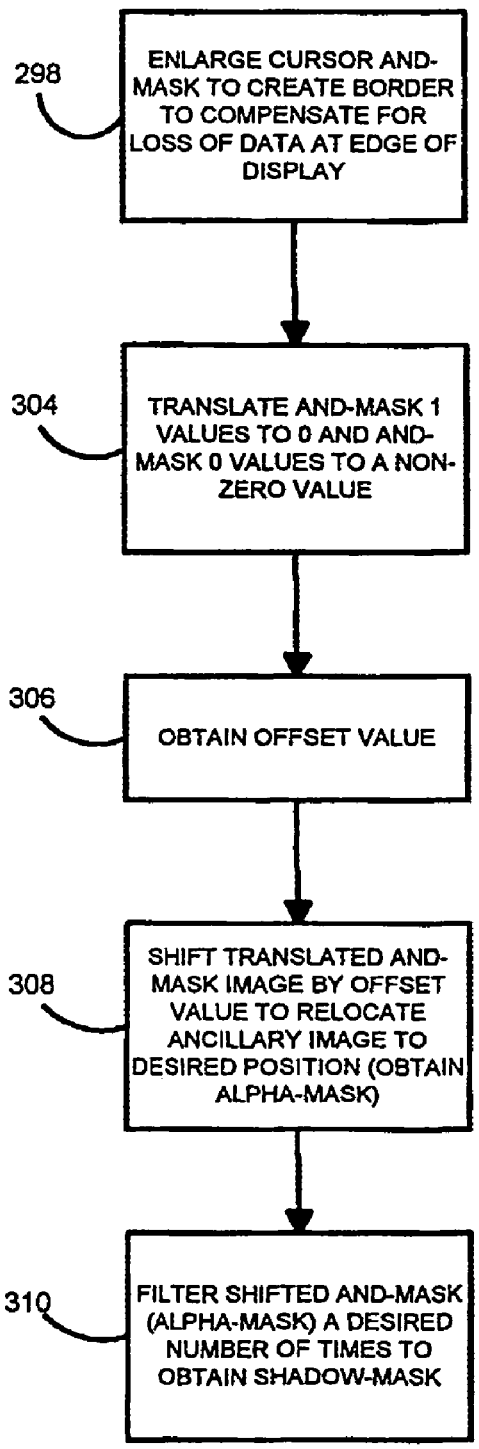
FIG. 6A is a flow diagram illustrating the creation of an ALPHA-mask and SHADOW-mask in accordance with one embodiment of the present invention.

FIG. 6A is a flow diagram illustrating the creation of the ALPHA-mask and SHADOW-mask in greater detail. There is an inherent loss of data at the edges of the cursor image due to the convolution filter. Further, in one illustrative embodiment, the convolution filtering operation is performed twice, which exacerbates the problem.

Therefore, in an illustrative embodiment, in order to compensate for this loss of data, the cursor AND-mask is initially expanded to a 32 bit per pixel bitmap in which invisible bits are mapped to a value of 0x00000000 where, for example, the first eight most significant bits (the bits on the left of the value) are indicative of the alpha value. The visible bits in the AND-mask are mapped to a value which has a non-zero ALPHA value. During this enlarging or expansion operation, extra space is allocated along the borders of the bitmap to accommodate for data loss. The border can be implemented, as an example, as a three pixel border. Enlarging the cursor AND-mask to create the border to compensate for loss of data at the edge of the display is illustrated by block 298 in FIG. 6A.

Translation of the AND-mask one values to zero and the AND-mask zero values to a non-zero alpha value is indicated by block 304 in FIG. 6A.

In addition, when the ancillary image is a shadow, it must be offset from the primary image of the cursor. Of course, the offset value can be predetermined or dynamically variable. Therefore, when the cursor AND-mask is expanded to the 32 bit per pixel bitmap, the pixels are positioned within the expanded bitmap, shifted by a desired vertical and horizontal offset value. FIG. 6B illustrates the original AND-mask 300 for a cursor image which is expanded into the ALPHA-mask 302. It can be seen that, in the embodiment illustrated in FIG. 6B, the ALPHA-mask is formed by providing an extra border around the AND-mask, and shifting the AND-mask downwardly and to the right, within the ALPHA-mask 302. Obtaining an offset value is indicated by block 306 in FIG. 6A, and shifting the translated AND-mask image by the offset value to relocate the ancillary image to a desired position (i.e., to obtain the ALPHA-mask) is illustrated by block 308 in FIG. 6A.

Once the ALPHA-mask is obtained in this way, it is filtered any desired number of times to obtain the SHADOW-mask, as is described above. This is indicated by block 310 in FIG. 6A.

Once the SHADOW-mask has been obtained, the cursor image and the SHADOW-mask can be blended to the computer display in one of a wide variety of different ways. In one illustrative embodiment, an alpha blending function is performed using an application programming interface (API) known as the AlphaBlend supported by the WIN32 API set provided by Microsoft Corporation of Redmond, Wash. Many different types of alpha compositing operations can be performed to accomplish this. However, in one illustrative embodiment, a simple "source over" operation is used. In this type of compositing operation, each resulting pixel displayed is a function of a source, a current destination, and an alpha value associated with the source as follows:

$$\text{Result}=(\text{source}*\text{alpha})+(1-\text{alpha})*\text{destination} \quad \text{Equation 1}$$

where the source color is the color of the shadow (e.g., black) and the destination is the image on the computer screen which will reside under the image being blended to the computer screen. The areas outside of the shadow and cursor have an alpha value of zero. Therefore, it can be seen from Equation 1 that the resulting pixels will be unmodified. The umbra portion of the SHADOW-mask has the highest alpha value, so those portions of the screen will have more black blended into the resulting pixels. The areas with an intermediate alpha value (the penumbras) will have somewhat less black blended into the resulting pixel values.

This source over function is applied to each of the color channels as follows:

$$\text{Result}_r=(\text{source}_r*\text{alpha})+(1-\text{alpha})*\text{destination}_r \quad \text{Equation 2}$$

$$\text{Result}_g=(\text{source}_g*\text{alpha})+(1-\text{alpha})*\text{destination}_g \quad \text{Equation 3}$$

$$\text{Result}_b=(\text{source}_b*\text{alpha})+(1-\text{alpha})*\text{destination}_b \quad \text{Equation 4}$$

Subscript r designates the red channel, the subscript g designates the green channel and the subscript b designates the blue channel. Therefore, source$_r$ corresponds to the red value for the pixel while sources and source$_b$ correspond to the green and blue source values for that pixel, respectively.

The shadow can be alpha blended to the screen first and the cursor drawn on top of the blended shadow. Alternatively, the cursor and shadow can be combined into a composite image and blended to the screen in a single step.

Further, the alpha values can be pre-multiplied against the source values. Therefore, instead of storing each pixel value as (r, g, b, a), the alpha values can be premultiplied against the red, green, and blue source values such that the values stored are (a*r, a*g, a*b, a). This is advantageous because the "source over" operation described earlier requires these values when computing the resulting pixel.

In any case, the combined cursor and shadow image will contain completely opaque cursor pixels (which have an alpha value of one), translucent umbra and penumbra pixels (which have an alpha value between zero and one), and completely transparent pixels that are neither in the cursor nor the shadow (which have an alpha value of zero). The combined image can then be AlphaBlended to the screen in a single step using the AlphaBlend API set.

Figure 7:
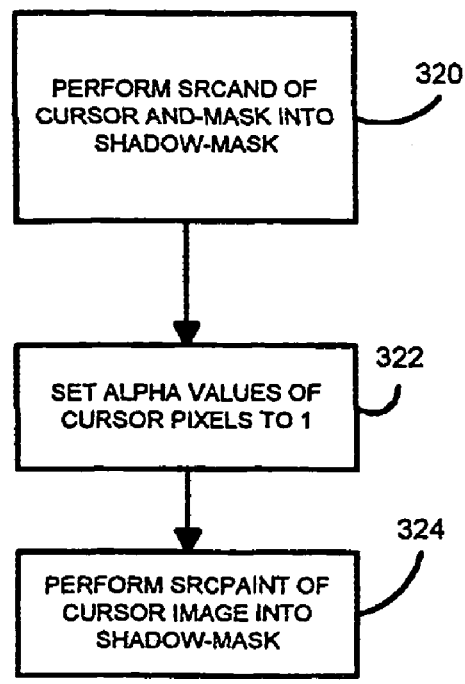
FIG. 7 is a flow diagram illustrating the blending of a cursor image and an ancillary image to a display screen.

FIG. 7 is a flow diagram illustrating how certain APIs can be used to accomplish the "source over" operation. Before discussing FIG. 7, it is first worth mentioning a number of terms used below. The AlphaBlend function is a function which displays bitmaps that have transparent or semitransparent pixels. The AlphaBlend function includes a parameter which specifies the Alpha-Blending function for source and destination bitmaps, such as the "source over" function.

The term BitBlt refers to a function which transfers pixels from a specified source rectangle to a specified destination rectangle, altering the pixels according to a selected raster operation code. The supported raster operation codes include the SRCAND code which combines the colors of the source and destination rectangles by using the BOOLEAN AND operator. The SRCPAINT code combines the colors of the source and destination rectangles using the BOOLEAN OR operator.

Documentation regarding the above-described functions and APIs is available from the Microsoft Corporation of Redmond, Wash.

With this background, FIG. 7 can now be discussed. While FIG. 7 proceeds with respect to the above-described functions and APIs, it will be appreciated that this is for illustrative purposes only, and any other desired mechanism can be used to generate a composite image. Once the SHADOW-mask has been created as described above with respect to FIG. 6A, the graphics engine performs an SRCAND function of the cursor AND-mask into the SHADOW-mask. The palette is set so that the AND-mask pixel values of zero are treated as the color transparent black (the (alpha, red, green, blue) values are (0.0, 0.0, 0.0, 0.0)) and the pixel values of one are treated as the color opaque white (the alpha, red, green, blue) values are (1.0, 1.0, 1.0, 1.0)). This combines the SHADOW-mask with the AND-mask using a logical AND function, which essentially cuts a hole in the SHADOW-mask for the opaque cursor image. In other words, where the AND-mask is visible (having a pixel value of zero), the SRCAND function results in zero, and where the AND-mask is invisible (having a pixel value of one), the SRCAND function results in the shadow remaining unchanged. This is indicated by block 320 in FIG. 7.

Next, the hole for the opaque cursor pixels is set to an alpha value of one in the SHADOW-mask by performing an SRCPAINT function of the cursor AND-mask into the SHADOW-mask. The palette is set so that the AND-mask pixel values of zero are treated as the color opaque black (the (alpha, red, green, blue) values (1.0, 1.0, 1.0, 1.0)) and the pixel values of one are treated as the color transparent black (the (alpha, red, green, blue) values are (0.0, 0.0, 0.0, 0.0)). This is indicated by block 322 in FIG. 7.

Finally, the graphics engine performs an SRCPAINT of the cursor image into the SHADOW-mask. This combines the cursor image with the SHADOW-mask using the logical OR operator to plug the cursor image into the hole left for it in the SHADOW-mask. This is indicated by block 324 in FIG. 7. It should also be noted that the composite image can be created by blending to a temporary bitmap and than simply copying the contents of the temporary bitmap to the display screen.

Of course, as discussed above, when an application is directly specifying the cursor image, it can specify the cursor image as an alpha blended ARGB image. If the cursor image is to include an ancillary image, the application can derive its own "ancillary" image and combine that image with the original cursor image. In addition, the application can do many other things, such as provide an artist-rendered ARGB bitmap which includes an artist-rendered shadow, specify alpha values such that the cursor image is anti-aliased with no shadow, specify combined alpha and color channels to provide substantially any desired affect (such as a glow or halo around the cursor image, translucent smoke emanating from the cursor image, etc).

Figure 8A:
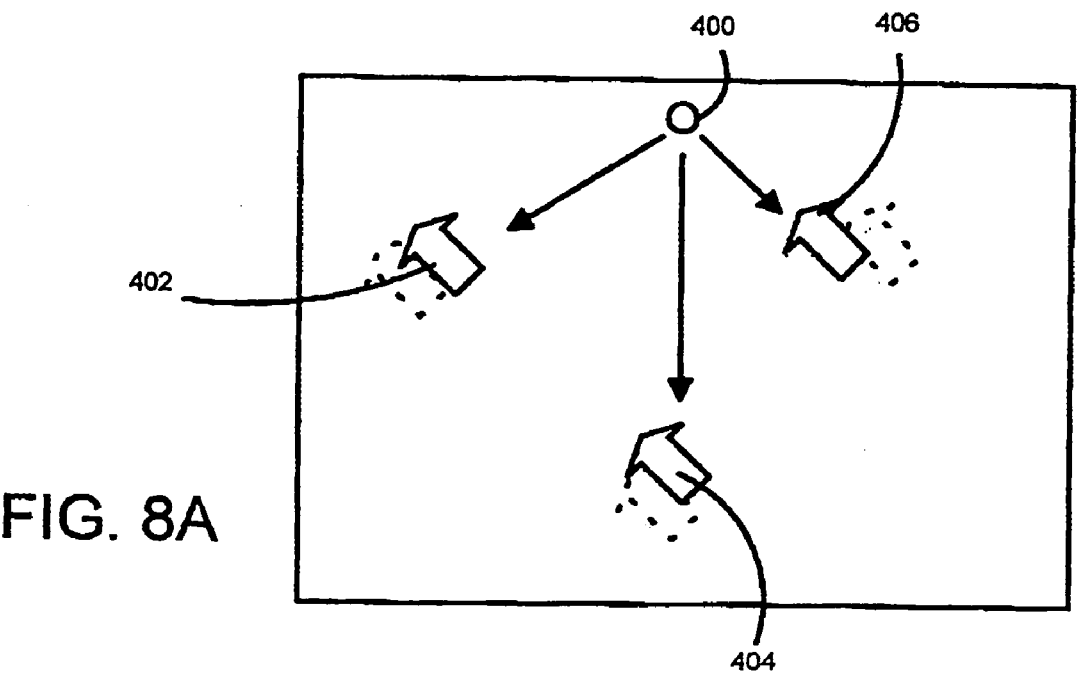
FIGS. 8A–8C illustrate alternate embodiments of ancillary images in accordance with further aspects of the present invention.
Figure 8B:
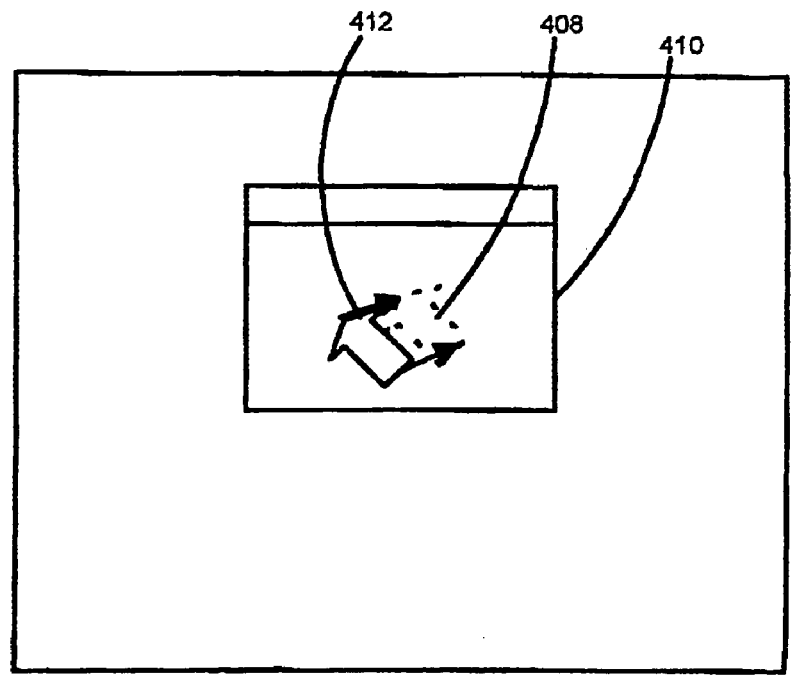
Figure 8C:
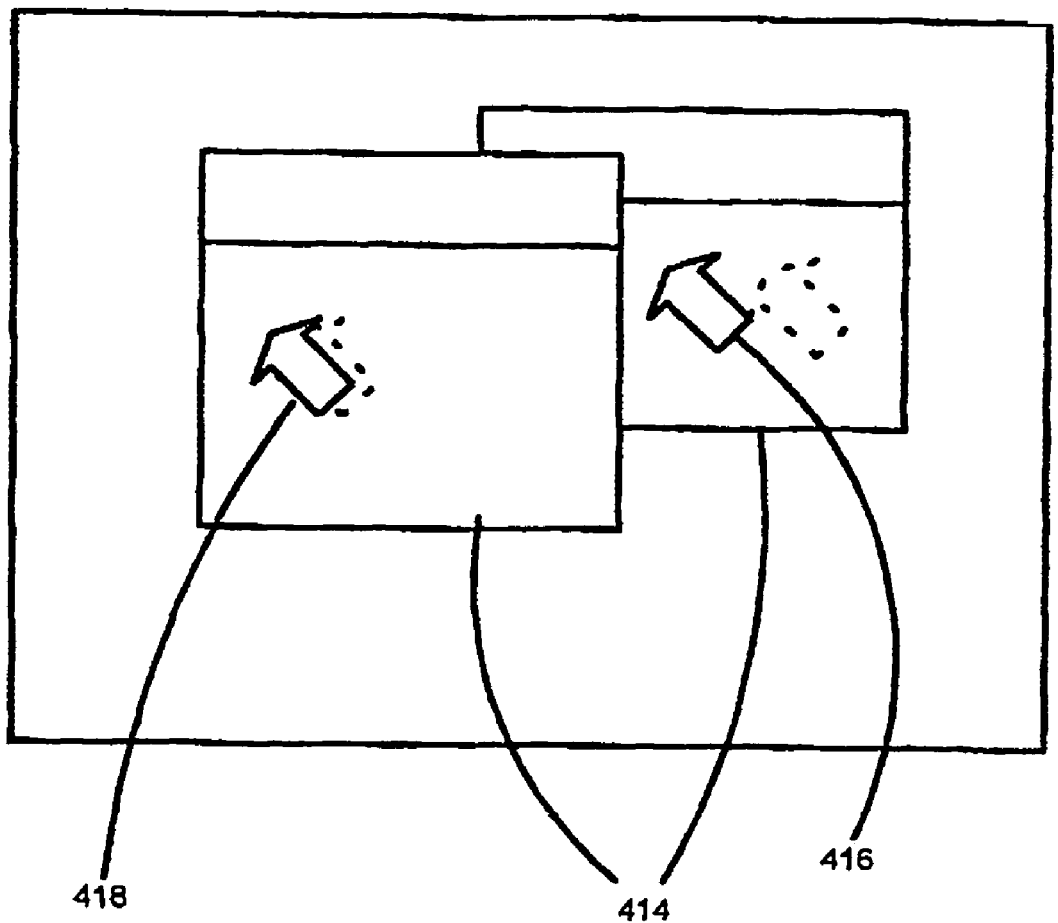

FIGS. 8A–8C illustrate a number of additional embodiments of the present invention. FIG. 8A illustrates that the ancillary image (in the embodiment illustrated, it is a shadow) need not have a static offset relative to the primary or cursor image. For instance, if the ancillary image is indeed a shadow, and the simulated point light source is fixed in the center of the screen, the shadow will be cast in a different direction depending on the position of the cursor image on the screen, relative to the simulated point light source. For example, if the point light source is positioned at a central top portion 400 of the screen illustrated in FIG. 8A, and the cursor is located at position 402, the ancillary image will be located downwardly and to the left of the cursor image (i.e., the shadow will be cast in a direction away from the point light source). Similarly, if the cursor is placed in position 404, the shadow will be cast substantially straight downwardly from the cursor image on the screen. Also, if the cursor is placed at position 406, the shadow will be offset downwardly and to the right of the cursor image. Of course, there need not be any visual display of the simulated point light source. This source is simply simulated based on how the shadow is cast.

Other embodiments are contemplated as well. For example, rather than having a fixed point light source, the point light source can emulate the sun, and can thus move from east to west (e.g., right to left) across the screen based on the time of day. In that case, the position of the shadow will change depending on the current position of the point light source and the current position of the cursor relative to the point light source. Also, of course, rather than being located at a central top region, the light source can be located at substantially any position on or off the screen such that the shadow will move about the cursor image based on its position relative to the point light source.

FIG. 8B illustrates yet another illustrative embodiment of the present invention. FIG. 8B illustrates the cursor placed at position 408 with respect to a display screen that is also displaying a window or icon 410. When the cursor is moved over the window or icon 410, the ancillary image (in the embodiment in which it is a shadow) is cast in the normal fashion. However, when the user depresses a mouse button (such as to acquire the target over which it is drifting) the cursor moves in the direction indicated by arrows 412. That is, in response to a mouse click, a message hook procedure executes to move the cursor image to where the shadow image had just been displayed. This has the appearance of the cursor moving downwardly onto the image over which it is traveling (and thus there is no shadowcast). Alternatively, for example, upon clicking the mouse button, the shadow can be replaced by a glow or halo rather than being eliminated.

FIG. 8C illustrates yet another illustrative embodiment of the present invention. It will be appreciated that windows, or icons, 414 illustrated in FIG. 8C can be layered over one another. In other words, the window in the foreground is displayed on top of the window in the background. Therefore, this gives the perception of depth within the display screen. In the illustrative embodiment shown in FIG. 8C, when the cursor is placed in position 416, it is over the window in the background. Since the cursor is always on the top of the display screen, this has the effect of the cursor being a relatively large distance away from the background window 414. Thus, the shadow or ancillary image is offset a relatively large distance from the cursor image. However, when the cursor is moved to position 418, it is positioned over the foreground window and is located closer to that window than the background window. In the embodiment illustrated in FIG. 8C, the ancillary image is thus offset by a smaller distance from the cursor image to give the appearance that the shadow is cast on a surface which is closer to the cursor image than the background window was. The depth information can be obtained from the data structure associated with the image under the displayed position of the cursor image.

Similarly properties of the shadow can be changed to indicate depth. For example, shadows on windows or icons which are deeper are more blurry. This can be done, in one illustrative embodiment, simply by controlling application of the convolution filter.

The shadow offset can also be adjusted based on the size of the cursor image. For example, when the cursor image is quite large, the offset can be increased so the offset is not overwhelmed by the cursor size. Similarly, the offset can be decreased for smaller cursors so the shadow does not appear disconnected from the cursor image.

Of course, the present invention can be used with dynamic or animated cursors as well. For example, some cursors commercially available today are dynamic or animated cursors in that they move. As one illustration, a cursor can be embodied as a galloping horse, a swinging monkey, etc. In those embodiments, the shadow or ancillary image is moved along with the dynamic or animated movement of the cursor image.

Similarly, the ancillary image need not only be a shadow. For example, the ancillary image can give the perception that the cursor image is a stained glass window and the ancillary image is an image generated by light impinging on the surface below the cursor image after the light has passed through the cursor image from the top. In that embodiment, the ancillary image is illustratively colored based on the color of the cursor. However, the ancillary image need not be opaque, as is the cursor image. In other words, if the cursor image is red, the ancillary image may be a light red tinted shadow image giving the impression of a red tint after light has passed through the red cursor image.

Similarly, the ancillary image can be one which reflects a simulated property of the cursor. In other words, if the cursor is displayed to look like a water droplet, the ancillary image can be a wavy shadow or image which gives the appearance of light impinging on a surface after it has traveled through water. In the illustrative embodiment, the ancillary image simply moves with the cursor image and is based on some characteristic or property of the cursor image.

It can thus be seen that one illustrative embodiment of the present invention provides a cursor with a shadow. This can be accomplished in any number of ways, such as by simply displaying or rendering a cursor which includes a shadow as a part of its image, or by obtaining information indicative of the cursor image and deriving the shadow based on the cursor information. Similarly, when the cursor and shadow are separately obtained or derived, they can be separately rendered on the display, or rendered as a composite image.

Other illustrative embodiments of the present invention include methods, displays and apparatus which provide cursor and associated ancillary images as ARGB bitmaps. The ancillary images can exhibit a wide variety of characteristics.

Although the present invention has been described with reference to preferred embodiments, workers skilled in the art will recognize that changes may be made in form and detail without departing from the spirit and scope of the invention.

What is claimed is:

1. A method of displaying a cursor, comprising:
obtaining a cursor image indication, indicative of a cursor image;
obtaining an ancillary image indication, indicative of an ancillary image, based on the cursor image indication;
forming a composite image indication indicative of a composite image containing both the cursor image and the ancillary image, a location at which the ancillary image is located being based on a location at which the cursor image is located; and,
displaying the composite image.

2. The method of claim 1 wherein obtaining a cursor indication comprises:
obtaining a cursor AND-mask.

3. The method of claim 2 wherein obtaining an ancillary image indication comprises:
obtaining an ALPHA-mask based on the cursor AND-mask.

4. The method of claim 3 wherein the cursor AND-mask comprises a bitmap having dimensions similar to dimensions of a bitmap defining the cursor image, and wherein each bit defines whether a display by a corresponding pixel is visible or non-visible.

5. The method of claim 4 wherein obtaining an ALPHA-mask comprises:
enlarging the AND-mask to include a border;
translating values in the AND-mask bitmap from visible values corresponding to a visible portion of the cursor image to translucent values; and
repositioning the translucent values within the enlarged AND-mask by a desired offset value.

6. The method of claim 5 wherein repositioning comprises:
repositioning the translucent values by a predetermined offset value.

7. The method of claim 5 wherein the repositioning step comprises:
obtaining the desired offset value based on a dynamically changing variable; and
repositioning the translucent values based on the obtained offset value.

8. The method of claim 7 wherein obtaining the desired offset value comprises:
obtaining the desired offset value based on a displayed position of the cursor image.

9. The method of claim 8 wherein obtaining the desired offset value comprises:
obtaining the desired offset value based on a displayed position of the cursor image and a time of day.

10. The method of claim 7 wherein obtaining the desired offset value comprises:
obtaining the desired offset value based on data associated with an image underlying a displayed position of the cursor image.

11. The method of claim 7 wherein obtaining the desired offset value comprises:
obtaining the desired offset value based on an operator input from a pointing device.

12. The method of claim 7 wherein obtaining the desired offset value comprises:
obtaining the desired offset value based on a size dimension of the cursor image.

13. The method of claim 3 wherein the displaying step comprises:
blending the ancillary image to a display screen based on the ALPHA-mask; and
blending the cursor image to the display screen based on the cursor AND-mask.

14. The method of claim 13 wherein blending the ancillary image and blending the cursor image are performed by blending a composite image, including an ancillary image component and a cursor image component, to the display screen.

15. The method of claim 13 wherein blending the ancillary image and blending the cursor image each comprise:
blending the ancillary image and the cursor image to a temporary bitmap; and
copying the contents of the temporary bitmap to the display screen.

16. The method of claim 3 wherein the displaying step comprises:
blending the ancillary image to a display screen according to a function having a first term corresponding to a portion of the ancillary image displayed and a second term corresponding to a portion of an underlying image displayed.

17. The method of claim 3 and further comprising:
softening the ALPHA-mask.

18. The method of claim 17 wherein the softening step comprises:
filtering the ALPHA-mask with an averaging filter a desired number of times.

19. The method of claim 18 wherein the desired number of times is based on data associated with an image underlying a displayed position of the cursor image.

20. The method of claim 1 wherein the ancillary image appears as a shadow of the cursor image.

21. The method of claim 1 wherein the ancillary image appears as an image formed by light impinging on a surface after passing through the cursor image.

22. A computer readable medium containing instructions which, when executed by a computer cause the computer to perform steps of:
obtaining a cursor image indication, indicative of a cursor image;
obtaining an ancillary image indication, indicative of an ancillary image, based on the cursor image indication;
forming a composite image indication indicative of a composite image containing both the cursor image and the ancillary image,
a location at which the ancillary image is located being based on a location at which the cursor image is located; and displaying the composite image.

23. The computer readable medium of claim 22 wherein obtaining a cursor indication comprises:
obtaining a cursor AND-mask.

24. The computer readable medium of claim 22, further comprising:
wherein obtaining a cursor image indication comprises obtaining a cursor AND-mask; and
wherein obtaining an ancillary image indication comprises obtaining an ALPHA-mask based on the cursor AND-mask.

25. The computer readable medium of claim 24 wherein the cursor AND-mask comprises a bitmap having dimensions similar to dimensions of a bitmap defining the cursor image, and wherein each bit defines whether a display by a corresponding pixel is visible or non-visible.

26. The computer readable medium of claim 25 wherein obtaining an ALPHA-mask comprises:
   enlarging the AND-mask to include a border;
   translating values in the AND-mask bitmap from visible values corresponding to a visible portion of the cursor image to translucent values; and
   repositioning the translucent values within the enlarged AND-mask by a desired offset value.

27. The computer readable medium of claim 26 wherein repositioning comprises:
   repositioning the translucent values by a predetermined offset value.

28. The computer readable medium of claim 26 wherein the repositioning step comprises:
   obtaining the desired offset value based on a dynamically changing variable; and
   repositioning the translucent values based on the obtained offset value.

29. The computer readable medium of claim 28 wherein obtaining the desired offset value comprises:
   obtaining the desired offset value based on a displayed position of the cursor image.

30. The computer readable medium of claim 29 wherein obtaining the desired offset value comprises:
   obtaining the desired offset value based on a displayed position of the cursor image and a time of day.

31. The computer readable medium of claim 28 wherein obtaining the desired offset value comprises:
   obtaining the desired offset value based on data associated with an image underlying a displayed position of the cursor image.

32. The computer readable medium of claim 28 wherein obtaining the desired offset value comprises:
   obtaining the desired offset value based on an operator input from a pointing device.

33. The computer readable medium of claim 26 wherein repositioning comprises:
   obtaining the desired offset value based on dimensions of the cursor image.

34. The computer readable medium of claim 24 wherein the displaying step comprises:
   blending the ancillary image to a display screen based on the ALPHA-mask; and
   blending the cursor image to the display screen based on the cursor AND-mask.

35. The computer readable medium of claim 34 wherein blending the ancillary image and blending the cursor image are performed by blending a composite image, including an ancillary image component and a cursor image component, to the display screen.

36. The computer readable medium of claim 24 wherein the displaying step comprises:
   blending the ancillary image to a display screen using according to a function having a first term corresponding to a portion of the ancillary image displayed and a second term corresponding to a portion of an underlying image displayed.

37. The computer readable medium of claim 24 and further comprising:
   softening the ALPHA-mask.

38. The computer readable medium of claim 37 wherein the softening step comprises:
   filtering the ALPHA-mask with an averaging filter a desired number of times.

39. The computer readable medium of claim 38 wherein the desired number of times is based on data associated with an image underlying a displayed position of the cursor image.

* * * * *

UNITED STATES PATENT AND TRADEMARK OFFICE
CERTIFICATE OF CORRECTION

PATENT NO. : 6,971,071 B2  Page 1 of 1
APPLICATION NO. : 09/520389
DATED : November 29, 2005
INVENTOR(S) : Impas et al.

It is certified that error appears in the above-identified patent and that said Letters Patent is hereby corrected as shown below:

| COLUMN | LINE | ERROR |
|---|---|---|
| 7 | 43 | Delete "sources" and insert -- $source_g$ --, therefor. |

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 6,971,071 B1  Page 1 of 1
APPLICATION NO. : 09/520389
DATED : November 29, 2005
INVENTOR(S) : Impas et al.

It is certified that error appears in the above-identified patent and that said Letters Patent is hereby corrected as shown below:

In column 8, line 30, insert -- ( -- before "alpha".

Signed and Sealed this

Thirtieth Day of March, 2010

David J. Kappos
*Director of the United States Patent and Trademark Office*